(12) United States Patent
Keret et al.

(10) Patent No.: US 11,735,188 B2
(45) Date of Patent: *Aug. 22, 2023

(54) SYSTEM AND METHOD FOR DETECTING FRAUD RINGS

(71) Applicant: Nice Ltd., Ra'ananan (IL)

(72) Inventors: Matan Keret, Oulu (FI); Anat Malin, Petach Tikva (IL); Natan Katz, Tel Aviv (IL); Shunit Metz, Herzliya (IL); Sigal Lev, Hod Hasharon (IL); Jeremy Hoyland, Bet Shemesh (IL)

(73) Assignee: Nice Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,049

(22) Filed: Sep. 12, 2022

(65) Prior Publication Data

US 2023/0005485 A1    Jan. 5, 2023

Related U.S. Application Data

(63) Continuation of application No. 15/931,892, filed on May 14, 2020, now Pat. No. 11,508,377.

(51) Int. Cl.
| | |
|---|---|
| *G10L 17/00* | (2013.01) |
| *G06Q 50/26* | (2012.01) |
| *G06N 20/00* | (2019.01) |
| *G06N 5/04* | (2023.01) |
| *G10L 17/06* | (2013.01) |

(Continued)

(52) U.S. Cl.
CPC ........... *G10L 17/00* (2013.01); *G06N 5/04* (2013.01); *G06N 20/00* (2019.01); *G06Q 50/265* (2013.01); *G10L 17/06* (2013.01); *H04M 3/2281* (2013.01); *H04M 3/42221* (2013.01); *H04M 2201/41* (2013.01); *H04M 2203/30* (2013.01); *H04M 2203/40* (2013.01); *H04M 2203/6027* (2013.01)

(58) Field of Classification Search
CPC ....... G10L 17/00; G10L 17/06; G06Q 50/265; H04M 3/2281; H04M 3/42221; H04M 2201/41; H04M 2203/30; H04M 2203/40; H04M 2203/6027
USPC ....................................................... 704/246
See application file for complete search history.

(56) References Cited

U.S. PATENT DOCUMENTS

| | | |
|---|---|---|
| 8,056,128 B1 | 11/2011 | Dingle et al. |
| 8,145,562 B2 | 3/2012 | Wasserblat et al. |

(Continued)

OTHER PUBLICATIONS

Glembek, Ondrej, Lukáš Burget, and Pavel Matejka. "Voice Biometry Standard, Draft." *Bmo: Speech@ FIT* (2015).

(Continued)

*Primary Examiner* — Md S Elahee
(74) *Attorney, Agent, or Firm* — Pearl Cohen Zedek Latzer Baratz LLP (57) ABSTRACT

A system and method may identify a fraud ring based on call or interaction data by analyzing by a computer processor interaction data including audio recordings to identify clusters of interactions which are suspected of involving fraud each cluster including the same speaker; analyzing by the computer processor the clusters, in combination with metadata associated with the interaction data, to identify fraud rings, each fraud ring describing a plurality of different speakers, each fraud ring defined by a set of speakers and a set of metadata corresponding to interactions including that speaker; and for each fraud ring, creating a relevance value defining the relative relevance of the fraud ring.

20 Claims, 7 Drawing Sheets

(51) Int. Cl.
*H04M 3/22* (2006.01)
*H04M 3/42* (2006.01)

(56) References Cited

U.S. PATENT DOCUMENTS

| | | |
|---|---|---|
| 8,225,413 B1 | 7/2012 | De et al. |
| 9,042,867 B2 | 5/2015 | Gomar |
| 9,237,232 B1 | 1/2016 | Williams et al. |
| 9,620,123 B2 | 4/2017 | Faians et al. |
| 9,917,833 B2 | 3/2018 | Gomar |
| 10,110,738 B1 | 10/2018 | Sawant et al. |
| 10,659,588 B1 | 5/2020 | Guan et al. |
| 10,678,899 B2 | 6/2020 | Keret et al. |
| 10,854,204 B2 | 12/2020 | Faians et al. |
| 10,911,600 B1 | 2/2021 | Frenkel et al. |
| 11,039,012 B2 | 6/2021 | Michaeli et al. |
| 11,108,910 B2 | 8/2021 | Frenkel et al. |
| 2004/0249650 A1 | 10/2004 | Freedman et al. |
| 2011/0206198 A1 | 8/2011 | Freedman et al. |
| 2013/0216029 A1 | 8/2013 | Pawlewski |
| 2015/0055763 A1 | 2/2015 | Guerra et al. |
| 2015/0142446 A1 | 5/2015 | Gopinnathan et al. |
| 2015/0269941 A1 | 9/2015 | Jones |
| 2015/0281446 A1 | 10/2015 | Milstein et al. |
| 2016/0142534 A1 | 5/2016 | Guerra et al. |
| 2018/0032755 A1 | 2/2018 | Odinak |
| 2018/0082689 A1 | 3/2018 | Khoury et al. |
| 2018/0152446 A1 | 5/2018 | Gomar |
| 2019/0037081 A1 | 1/2019 | Rao et al. |
| 2019/0373105 A1 | 12/2019 | Kung et al. |
| 2020/0184979 A1 | 6/2020 | Keret et al. |
| 2020/0250290 A1 | 8/2020 | Keret et al. |
| 2021/0037136 A1 | 2/2021 | Michaeli et al. |
| 2021/0112163 A1 | 4/2021 | Frenkel et al. |

OTHER PUBLICATIONS

Kleiweg, Peter, http://let.rug.nl/~kleiweg/lev/, "Levenshetein Demo", printed Jan. 4, 2022.

FRAUD RING EXPOSURE

Suspected Fraud Rings
Last updated: Jul 22, 2019, 5:35:40 PM

Sync Fraudster List (On)

| Analyzed Calls | Call Origin | | Approved Fraud Rings |
|---|---|---|---|
| Between Jul 1, 2019 - Jul 22, 2019 | | Mismatch / Credit Card Ag... / Mortgage Agents | 36 |
| 488,555 | | | |

| SUSPECTED FRAUD RINGS | NO. of SUSPECTED FRAUDSTERS | SIMILARITY TYPES | STATUS | RANK | COMMENTS ADDED |
|---|---|---|---|---|---|
| Fraud Ring No. 1 | 6 | ☎ 🌐 | ☑ Approved | High | |
| Fraud Ring No. 2 | 3 | ☎ 👤 | ☑ Approved | High | Yes |
| Fraud Ring No. 3 | 4 | ☎ 🌐 | ☒ Rejected | High | |
| Fraud Ring No. 4 | 4 | ☎ 👤 | ☑ Approved | High | Yes |
| Fraud Ring No. 5 | 3 | ☎ 🌐 | | High | |
| Fraud Ring No. 6 | 1 | ☎ 👤 | ☑ Approved | High | Yes |
| Fraud Ring No. 7 | N/A | | | High | |
| Fraud Ring No. 8 | N/A | | | High | Yes |
| Fraud Ring No. 9 | N/A | | | | |
| Fraud Ring No. 10 | N/A | | | | |

Fig. 7

SYSTEM AND METHOD FOR DETECTING FRAUD RINGS

PRIOR APPLICATION DATA

The present application is a continuation of prior U.S. application Ser. No. 15/931,892 filed on May 14, 2020, entitled SYSTEM AND METHOD FOR DETECTING FRAUD RINGS and incorporated herein by reference in its entirety.

FIELD OF THE INVENTION

The present invention relates generally to fraud detection technology, and more specifically technology detecting fraud attempts by groups of individuals, such as against a contact center or other entity.

BACKGROUND OF THE INVENTION

Computer systems exist to detect fraud perpetrated against call centers or other organizations via interactions such as voice or telephone interactions. An interaction may be a conversation or exchange of information between two or more people, for example a customer, person or fraudster on the one hand, and a call center agent or another person on the other hand. An interaction may be for example a telephone call, chat exchange, e-mail exchange, or combination of such exchanges. An interaction may describe both the event of the conversation and also the data associated with that conversation, such as an audio recording of the conversation, text messages exchanged as part of the interaction, and metadata. Metadata describing an interaction may include information beyond the exchange itself: metadata may include for example the telephone number of the customer or fraudster (e.g. gathered via AM, automatic number identification), an internet protocol (IP) address associated with equipment used by the caller or fraudster, account information relevant to or discussed in the interaction, the purported name or identification (ID) of the person, audio information related to the interaction such as background noise, and other information.

Technology exists to detect fraudsters by clustering calls or interactions based on the fraudster's voice. Such technology may not be able to detect a coordinated, linked defraud effort of multiple different fraudsters, which may be termed a fraud ring.

A group of individuals in a fraud ring may cooperate to produce damage to an organization or individual. For example, more than one separate person (each person having a different voice) may call the same institution in order to obtain a fraudulent loan, using the same general techniques. Each person may call the institution using a different phone number and different name, making it hard to correlate the different people as being part of one ring. In another example, a number of different people may contact a certain institution regarding the same individual account, each attempting to get an item of information regarding the account with the goal of taking over or taking control of the account, e.g. to fraudulently transfer funds.

SUMMARY OF THE INVENTION

A system and method may identify a fraud ring based on call or interaction data by analyzing, by a computer processor, interaction data including audio recordings to identify clusters of interactions which are suspected of involving fraud, each cluster including interactions having the same speaker (typically the same speaker external to the organization, not necessarily the same speaker being an agent within the organization); analyzing by the computer processor the clusters, in combination with metadata associated with the interaction data, to identify fraud rings, each fraud ring describing a plurality of different speakers, each fraud ring defined by a set of speakers and a set of metadata corresponding to interactions including that speaker; and for each fraud ring, creating a relevance value or score defining the relative relevance of the fraud ring.

Embodiments of the invention may improve security or fraud detection technology, by for example analyzing call metadata together with voice clusters to expose sophisticated fraud rings. Machine learning (ML) algorithms may be used, and may receive calls and metadata, and may provide an indication as to whether a suspicious fraud ring is detected or not, automatically.

Currently, it is difficult or impossible to determine complex connections between interactions that would indicate suspected fraud rings. Doing so manually is difficult and impractical, and a human would not use the various algorithms discussed herein. Embodiments may expose cross-cluster connections that are not detected by standalone clustering algorithm.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
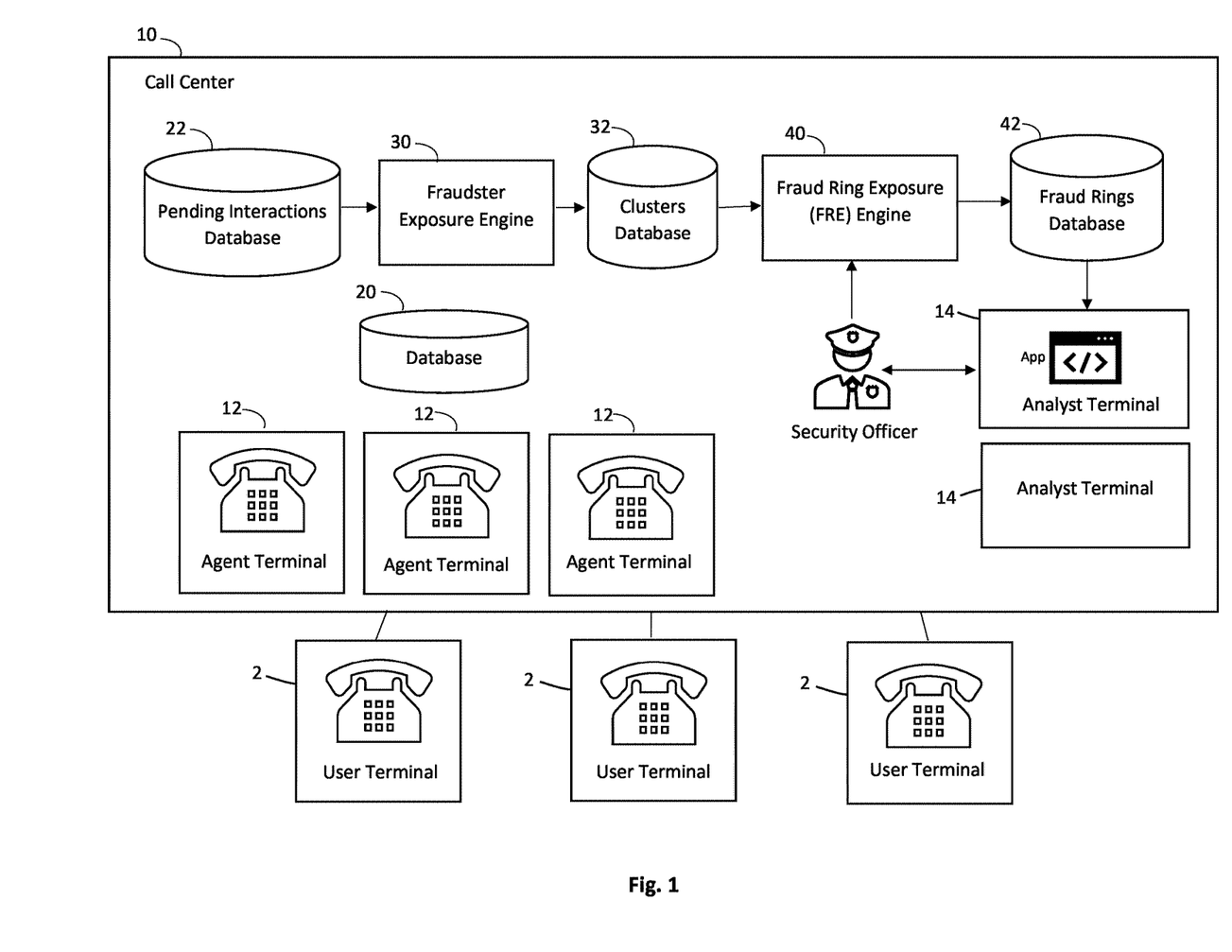
FIG. 1 depicts a call center and fraud analysis system according to embodiments of the present invention.

FIG. 1 depicts a call center and fraud analysis system according to embodiments of the present invention. Call center 10 may include one or more agent terminals 12 used by agents to communicate with users (e.g. legitimate users and fraudsters, variously) operating user terminals 2 during interactions; and one or more analyst terminals 14, used by security officers, analysts, or other personnel to analyze data output by call center 10 and to input data or feedback, or control the process. Data such as interaction data (e.g. audio recordings, screen capture data, and metadata which may include customer relationship management (CRM) data) may be stored in database 20 and in other systems described. Pending interactions database 22 may store data describing interactions filtered or flagged for fraud analysis which are to be analyzed by a PFE (Proactive Fraudsters Exposure, also termed Fraudster Exposure Engine) engine 30, which may expose fraudsters by clustering interactions by voice, and possibly other information such as account number. Cluster database 32 may store clusters of interactions deemed to be relevant (e.g. where fraud is suspected, or risky transactions are involved, determined to be from the same person. Fraud ring exposure (FRE) engine 40 may determine or identify, using clusters and other data such as metadata, fraud rings, stored for example in fraud ring database 42.

A single person identified by voice may have multiple interactions associated with that person clustered to a voice cluster. Embodiments may analyze metadata in addition to voice clusters to find rings such as groups of associated people committing fraud in coordination, where a data object describing a ring may have, include or link to multiple clusters (each cluster corresponding to a person in the real-world ring). Each individual in a ring might not themselves trigger an alarm, but forming rings into clusters may improve the ability of fraud technology to detect fraud.

Embodiments may improve fraud detection technology by combining "Something you are" (e.g. biometric information such as a voiceprint) with "Something you have" (e.g. a smart personal identification card, RSA SecureID token device, a telephone device or a subscriber identification module (SIM) card) and "Something you know" (e.g. a password or one's primary school's name). Such methods may expose cross-cluster connections that cannot be detected by prior art standalone clustering algorithms.

Figure 2:
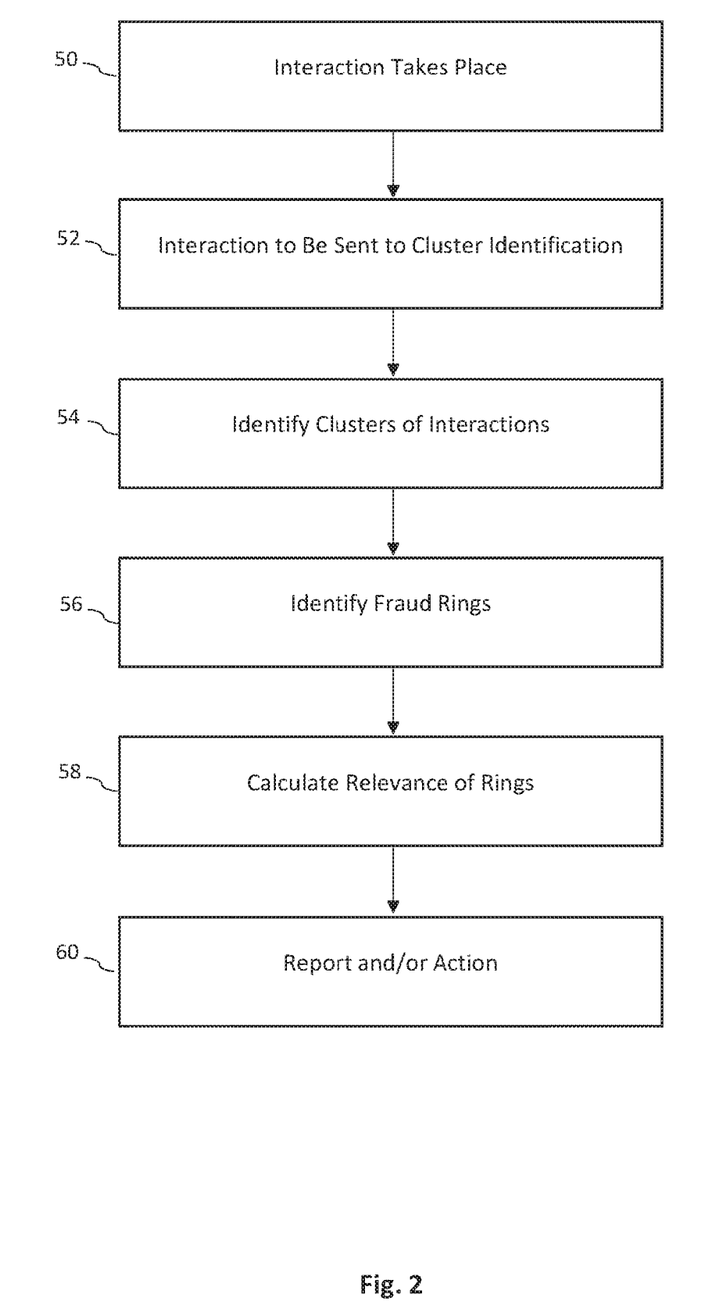
FIG. 2 shows a flowchart of a method according to embodiments of the present invention.

FIG. 2 shows a flowchart of a method according to embodiments of the present invention. The operations of FIG. 2 may be performed by the systems described in FIGS. 1 and 7, but other systems may be used.

In operation 50, an interaction may take place; for example a person (e.g. external to the organization) may engage in a telephone call with an agent at a call center (the agent typically internal to the organization, e.g. the call center) regarding a certain account. The interaction itself (an audio recording of the call) may be recorded, and data describing the interaction, such as metadata, may be recorded. In some embodiments, if the interaction involves a user using a computing device including for example a mobile application or a web page, additional metadata may be captured such as the behavior of the user relative to the device or software, e.g. the way the user moves the mouse, the buttons interacted with, timing of operations etc.

Only certain interactions, for example those corresponding to certain rules, may be input to cluster detection and/or ring-detection processes; in other embodiments all interactions may be input to a cluster and/or ring-detection process, Interactions or calls may first be collected and filtered or flagged to produce calls or interactions which are deemed to be high risk, significant, or otherwise relevant to a PFE process to determine or create clusters of interactions by the same speaker possibly involved in fraud or high risk transactions. A PFE cluster may be a group of events and data where a person with the same voice (thus the same person) engages in multiple interactions or telephone calls with one entity such as a call center (where the person associated with the call center, e.g. the agent is not considered to be the person with the same voice). A PFE cluster may be detected by detecting the same voice (typically the same calling voice, or the same voice external to the call center) used across multiple interactions, e.g. using voiceprint matching or comparison. A PFE cluster may refer to both the real-world events (e.g. multiple interactions) and the data structure(s) representing such a cluster. A cluster may include or be identified by data such as a cluster ID (identification), the telephone numbers involved, a voiceprint, a cluster score (e.g. measuring the probability the identified cluster is in fact a cluster), etc.

In some embodiments interactions or audio recordings may be analyzed to identify clusters or groups of such recording or interactions which are suspected of fraud or being associated with fraud, where each cluster includes or is associated with interactions or audio recordings, each interaction or audio recording associated with the same speaker (the speaker being other than an agent at a call center).

Thus, in operation 52, in an identification or "tagging" phase, it may be determined if the interaction should be sent to a cluster identification process. A set of rules may have been defined (e.g. by a security officer) that describe which interactions should be sent for cluster or ring analysis. Example rules include for example, that if any of the following occur, the interaction should go to cluster:

a. If the speaker received a mismatch result during authentication, e.g. authentication failed because it was determined that the speaker was not who s/he said s/he was; and/or b. The speaker asked to perform a high risk transaction; and/or c. The agent that handled the interaction is associated with special or "VIP" group that should always be monitored.

Other or different rules may be used. When an interaction or call ends, its information (e.g. voice data, metadata) may be sent to a calls or interaction collection engine which applies rules or other functionality to determine if the interaction matches to one or more pre-defined rules of the system. If the interaction matches one or more of the rules, it is stored in a pending interaction database 22 pending interaction database, waiting to be analyzed by a PFE engine 30.

In operation 54 a computer processor such as processor executing or acting as a PFE engine 30 may analyze calls or interactions filtered or flagged and deemed to be highly relevant (e.g. stored in pending interaction database 22) to identify clusters of interactions, for example those which are suspected of involving fraud each cluster including the same speaker. Each cluster may be represented as, stored as, or defined by a graph of relevant data, with data such as metadata (e the purported identity of a caller, the voiceprint-defined identity of the caller, etc.) linked to other data in the cluster by relationships, arcs, links or edges. Other methods of defining, storing or representing a cluster may be used.

Clustering may be performed periodically, for example once a day, or based on other periods, or other triggers to start.

Clusters of interactions may be created by matching the voices in the various interactions to other voices in the interactions. In one embodiment, for each relevant interaction a voiceprint (VP) may be created, stored for example in database 20, pending interaction database 22, and/or cluster database 32, the voiceprint representing features of the person's voice. A VP may be a spectrogram, or acoustic frequency spectrum of a voice, or a vector or feature vector of, for example, 400 numbers, typically stored in digital form. A VP may be a vector of voice biometric attributes. A cluster may be represented as a matrix or a list of VP vectors, together with a calculated score or rank; a cluster may be for example a collection of voice prints and a calculated score. For example, for each cluster, the confidence and/or amount of the inner ties among VPs may be calculated, and this value or score may be normalized. This score may be used to sort the clusters and decide which are relevant (e.g. to a ring detection process) and which are not. One embodiment may use probabilistic linear discriminant analysis (PLDA) scores to compare VPs. Other embodiments may use a neural networks (NN) such as a DNN (e.g. using x-vectors). A cluster may also be represented as a graph. VI's may be compared using similarity scores, resulting from a comparison of two voice samples based on extracted i-vectors.

Clustering voices into clusters may be performed by generating a similarity score for each pair of voices or VPs, each voice or voiceprint corresponding to an interaction, and then performing an algorithm such as the following:

Given N interactions, and a threshold (T)—N empty groups (G).
Create a N×N matrix (M) containing compare scores of all pairwise comparisons of pairs of VPs.
Diagonal values nay be set to (-infinity).
For i from 0 to N:
a. Find the maximum value for row i, for example i being in index j
b. if maximum >T:
  i. if G[i] and G[j] are both empty—assign them to a nee cluster.
  ii. if G[i] is empty and G[j] is not—assign G[i] to G[j] (and vice versa
  iii. if G[i] and G[j] are both assigned—merge them.
if not:
G[i] is assigned to a new cluster
T may be determined for example by:
Take all the pairwise scores, calculate their mean and variance, T=mean−Z*variance.
Where Z is empirically tested to be from 1 to 2 (commonly 2)

In some embodiment, when detecting extremely large clusters, for example more than 100 calls in one cluster, repeat all the above for each large cluster, creating sub-clusters.

PFE engine 30 may read the information from pending interaction database 22 and create a voiceprint from that interaction. PFT, engine 30 may collect the voiceprints of the interactions that it has perform a clustering algorithm on these voiceprints. The outcome of the procedure may be clusters of interactions of potential speakers stored for example in cluster database 32.

A cluster database may be a graph database, a relational database, or another type of database. An example of a representation or entry of an identified cluster representing one speaker engaging in multiple interactions, where the cluster has been identified as suspicious, fraudulent, or risky, according to some embodiments, is shown in FIG. 3A, with a legend according to some embodiments, describing the entities in FIG. 3A, shown in FIG. 3B.

Figure 3A:
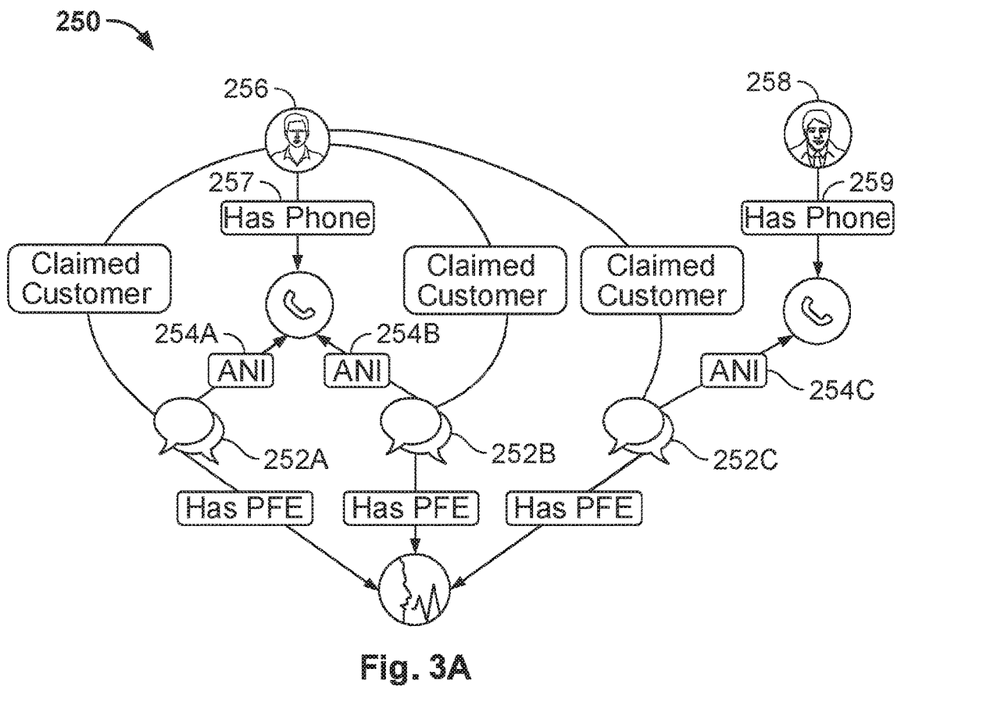
FIG. 3A depicts an example of a representation or entry of an identified. PFE (Proactive Fraudsters Exposure, also termed Fraudster Exposure Engine) cluster representing one speaker engaging in multiple interactions, where the cluster has been identified as suspicious, fraudulent, or risky, according to some embodiments, with a legend according to some embodiments, describing the entities in FIG. 3A, shown in FIG. 3B.
Figure 3B:
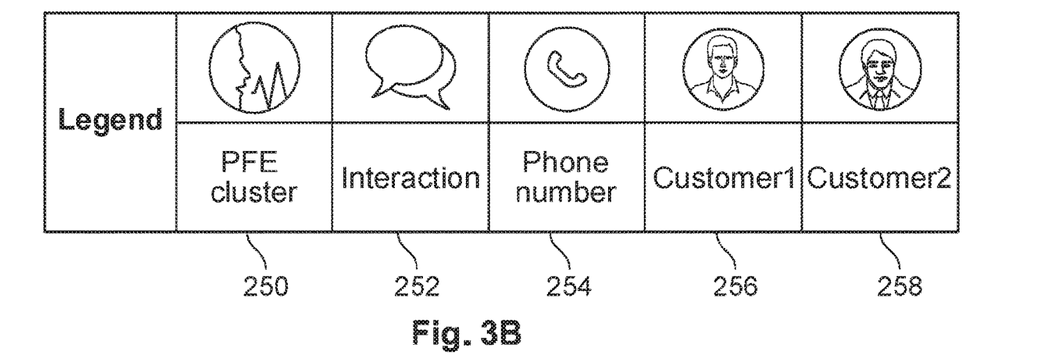

In the legend provided in FIG. 3B it can be seen that each PFE cluster 250 may include one or more interactions 252, telephone numbers 254, and a purported identity of a caller or speaker such as customers 256 and 258. Other components of PFEs may be used.

In FIG. 3A it can be seen that a PFE cluster 250 may include one or more interactions 252A, 252B and 252O, telephone numbers 254A, 254B and 254C used to make the calls, and purported identities of a caller or speaker (e.g. "claimed customer") such as that of customer 256 (having actual telephone number 257) and that of customer 258 (having actual telephone number 259). Arcs or links 218 may connect related entities (e.g. a claimed identity related to a specific interaction) in FIGS. 3A and 4.

Figure 4:
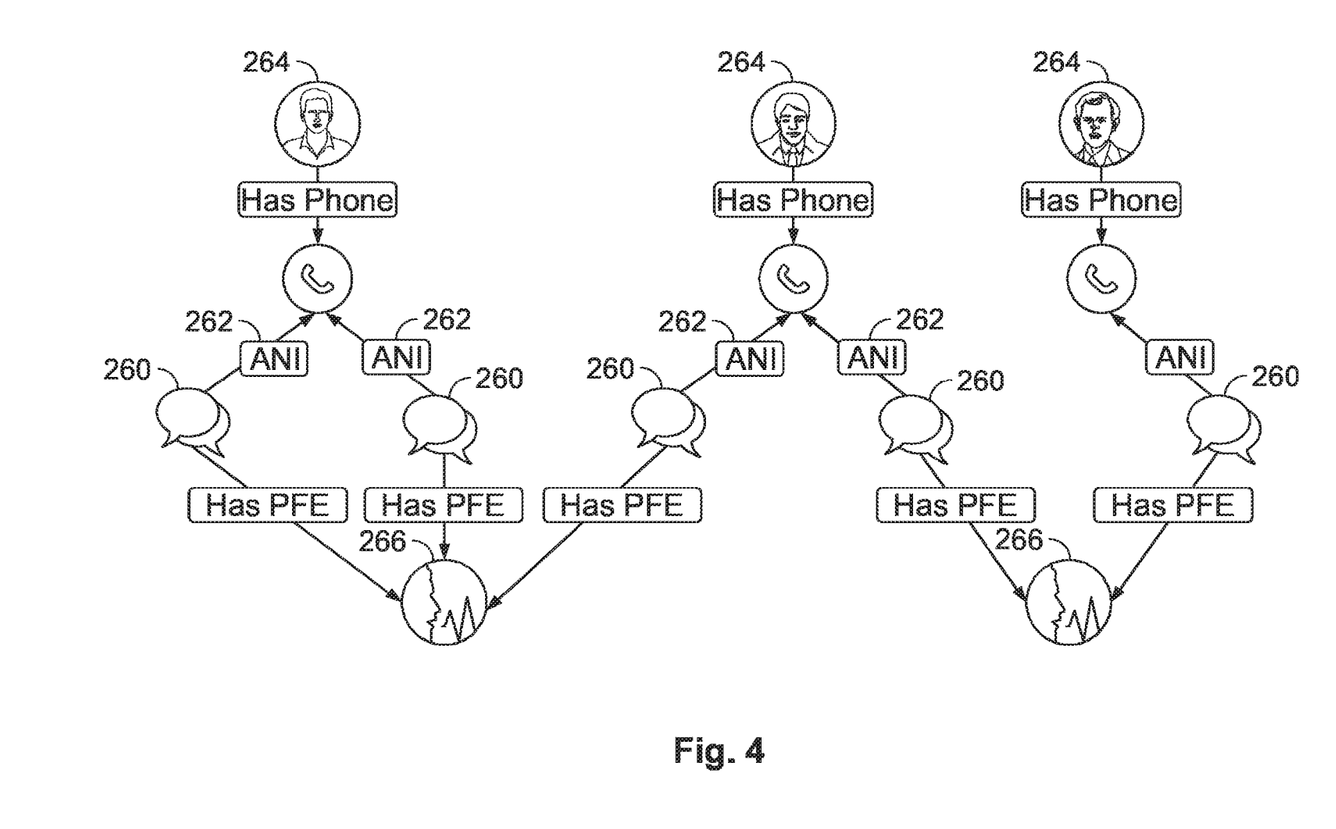
FIG. 4 depicts an example of a representation or entry of a fraud ring, e.g. a metadata pattern, representing two speakers engaging in multiple interactions, where the cluster has been identified as suspicious, fraudulent, or risky, according to embodiments of the present invention.

In FIG. 3A it can be seen that claimed customer 256 has, according to system records, telephone number 257 (e.g. as recorded in a customer database). During several interactions, that claimed customer 256 having telephone number 257, was identified by ANIs (e.g. caller identifications) 254A and 254B, used in association with that claimed customer during those interactions. In addition, the voice on the associated interactions 252A and 252B was identified as belong to one individual. However, when the same individual (e.g. identified by voice) has an interaction with an ANI or number (e.g. 254C), which is associated with a customer (in this case customer 258) other than the claimed customer (in this case 256), it raises the concern of a fraud. The graphs in FIGS. 3A and 4 are visual representations of data which may be stored in databases of various formats.

It can be seen in example PFE cluster 250 that one person (identified since a certain single voice across a number of events helps to define a PFE cluster) has been involved in three interactions or calls, one interaction with one phone number and one claimed identity and two others with a different phone number and a different claimed identity. The data or metadata pattern in the graph in FIG. 3A shows three interactions with similarities. All three are part of the same PPE cluster, indicating the same speaker; in all three, the claim of the speaker was that the speaker was Customer1, and the telephone number or ANI of the two interactions on the left match the listed phone number of the claimed customer (Customer1) while the telephone number or ANI of the interaction on the right does not match the listed phone number of the claimed customer but rather matches a listed phone number of a different customer (Customer2), who is not the claimed customer of that interaction. This pattern of metadata connections (e.g. when analyzed in light of rules) indicates a potential fraud.

In operation 56 a computer processor (e.g. by executing FRE engine 40) may use the clusters, in combination with metadata associated with the interaction data, to identify fraud rings saved in fraud ring database 42, e.g. to identify cross-cluster connections. Each fraud ring may describe or involve a number of different speakers, and may be defined by or include a set of speakers and a set of metadata corresponding to interactions including or associated with that speaker. A ring may be represented as, stored as, or defined by a graph. Fraud ring database 42 may be a graph database, or another database such as a relational database. Identifying or creating fraud rings may include analyzing clusters in combination with metadata associated with the interactions, clusters, speakers, or audio recordings. Each fraud ring may be associated with a number of different speakers and a set of metadata corresponding to the speakers, interactions or clusters.

In one embodiment, a fraud ring identification or detection process may be initialized with rules, and then during operation optimize detection by using feedback (e.g. from technicians). For example, a technician may understand from a specific user or customer what types of metadata and metadata connections are important or which define rings. For example, rules may cause clusters to be combined to rings if two people who are different per their voiceprint or providing different self-identification, provide or use the same phone or account number, which indicates clusters including those two people are in the same ring. A set of rules may be developed based on this information for use by a ring identification process, which may identify rings and provide the rings to a technician. The technician may provide feedback in response to the identified rings. For example, a technician may indicate that identified fraud rings are or are not fraud rings, or the technician may indicate that certain links within an identified ring (e.g. as seen in FIG. 4) are more or less important. Such feedback may include scores or ratings of rings or links. After receiving this feedback, a ring identification process may learn and create ratings or weights for the rules, diminishing or increasing the power or use of certain rules during the identification process. Other ring identification processes may be used.

In one embodiment, a process may use rules to connect clusters into rings. For example, a ring may include information such as:

1. ANIs or telephone numbers of incoming calls;
2. Cluster affiliations (e.g. cluster IDs or identifications; the cluster scores; and amount of people in the ring);
3. Geolocations of speakers;
4. Devices used by people in the cluster;
5. Speaker accents;
6. Whom do the people making up the clusters in the ring claim to be and information about this target.

Example rules for deciding whether clusters form a ring, or for forming a ring, may include:

If two clusters include the same "purported" person, e.g. if the two clusters are targeting the same account; and If two clusters share the same geolocation or the same or similar ANI.

Potential rules for deciding whether a ring is relevant or not may include the following:

a. If the number of clusters in the ring is greater than two and the min score clusters>X (e.g. X=40), then the ring is relevant
b. If each call in the cluster appears only once in the ring or it has no cluster-relevance (e.g. this may indicate an organized attack of several people);
c. If the ring contains a single call to a limited account; Not relevant
d. All the calls are related to the same cluster, took place during a brief period of time (e.g. 90 minutes), and target's account (e.g. the account of the person the callers purport to be) is rated highly and has a high annual income of (e.g. $2,000,000–Relevant)
e. The geolocation of the callers and the target location are close (e.g. less than 10 KM apart) and the accent of the speaker is local to the location of the target—Not relevant An embodiment may include weights for each of the attributes or rules. Such an embodiment may include weighted rules such as:

70%*cluster scores +30% (amount of accents foreign to a location such as that of the target>25. Relevant, Else Not Relevant 50%*number of people in the clusters in a ring +20%*0.1*cluster_scores +30% percentage of the targeted account annual income <60—Not relevant Ring detection may be performed periodically, for example once a day, or based on other periods, or other triggers to start.

Fraud ring database 42 may be a graph database, a relational database, or another type of database. An example of a representation or entry of a fraud ring, e.g. a metadata pattern, representing two speakers engaging in multiple interactions, where the cluster has been identified as suspicious, fraudulent, or risky, is shown in FIG. 4, with a legend describing the entities in FIG. 4 shown in FIG. 3B. The data in the graph in FIG. 4 shows five interactions 260, each interaction tied to a specific telephone number 262, each interaction or phone number tied to a certain purported customer ID 264, the interactions split between two different PFE clusters 266, indicating two different speakers. Each individual speaker is associated with or described by the fraud ring, and is suspected as a fraudster. Looking at the information in the graph in FIG. 4, as a whole, reveals potential collaboration between the two potential fraudsters (the speakers associated with PFE clusters 266), which may lead to fraud ring exposure.

The metadata corresponding to interactions 260 including the speakers may include for example the information included in the graph entry itself, such as the ties of the speakers to the interactions, the ties of the interactions to the phone numbers and purported identities of the speakers, telephone numbers (e.g. AM information), call origin location, information in or derived from call transcriptions, personal information or details on the callers or on the purported identities of the callers, audio quality similarities, IP addresses, the use by or behavior of a user relative to a device or software used for the interactions, e.g. the way the user moves a mouse, buttons interacted with, timing of operations, and/or other metadata. Metadata may be represented in manners other than a graph. A ring may be defined in part by the speakers associated with the ring. Some of such metadata may identify ties or connections between clusters. Metadata may include interaction transcripts or information derived from such transcripts: for example certain text repeating across calls may indicate a correlation among the calls, and thus a ring. In some embodiments metadata may include data describing similar call audio features or quality across calls, for example certain voices in background or other background noise, or repeating white noise.

Input to FRE engine 40 may be a graph or other database (e.g. information as depicted in FIG. 3A), with the addition of metadata or related, such as independent exterior information (information about the rings from exterior sources) of malicious potential fraudsters (e.g. calls that are likely to be fraudster). Each ring may be defined by a graph of relevant data, with data such as metadata linked to other data in the cluster by links or edges. Other methods of defining a cluster may be used.

At this point in the example process it may be considered that every ring is relevant, and that a person such as a security officer can and should check each and every obtained ring. However, this may cause excessive amounts of effort imposed on the personnel such as a security department; in addition statistically there would likely be a certain false positive rate of obtained rings. Thus a relevance function or value may be used. The relevance or rank of rings may include exterior knowledge about the clusters (e.g. metadata) that are contained in an identified ring. In contrast rank or score of clusters (e.g. cluster score) may be based only on the biometric (e.g. voiceprint) information.

In operation 58, for each ring identified in operation 56, a computer processor may calculate or create a relevance or significance value or function, determining the relative relevance of the ring, typically in comparison to other rings. A relevance value, score or function may be created using for example, a supervised learning method, semi-supervised methods, unsupervised methods, rule based methods, random forest methods, NNs or DNNs, Bayesian methods, principal component analysis (PCA, a statistical procedure that uses an orthogonal transformation to convert a set of observations of possibly correlated variables into a set of values of linearly uncorrelated variables called principal components), an auto-encoder system, or other methods. Embodiments may be semi-supervised for example in that an unsupervised process may provide a set of proposed relevant fraud rings, and user feedback based on that set may be used to alter the model used by the process.

Embodiments may induce a relevance measurement which may decide which of the rings are relevant for the security officer or other personnel. An embodiment may receive as input suspected ring structures which may be for example a combination of elements such that a PFE module identifies their biometrics similarity, and they are endowed with additional CRM or other metadata similarities which a graph or other structure may reveal. An output may be for example one or more coherent rings which require taking action.

In operation 60, a report may be generated and displayed to a user and/or action may be taken. Action may include embodiments automatically adding the fraudsters, or fraudster rings, fraudsters' voices, or other information, to a watchlist, without a human intervention, for example based on a relevance being higher than a threshold or a ML determination.

Figure 5:
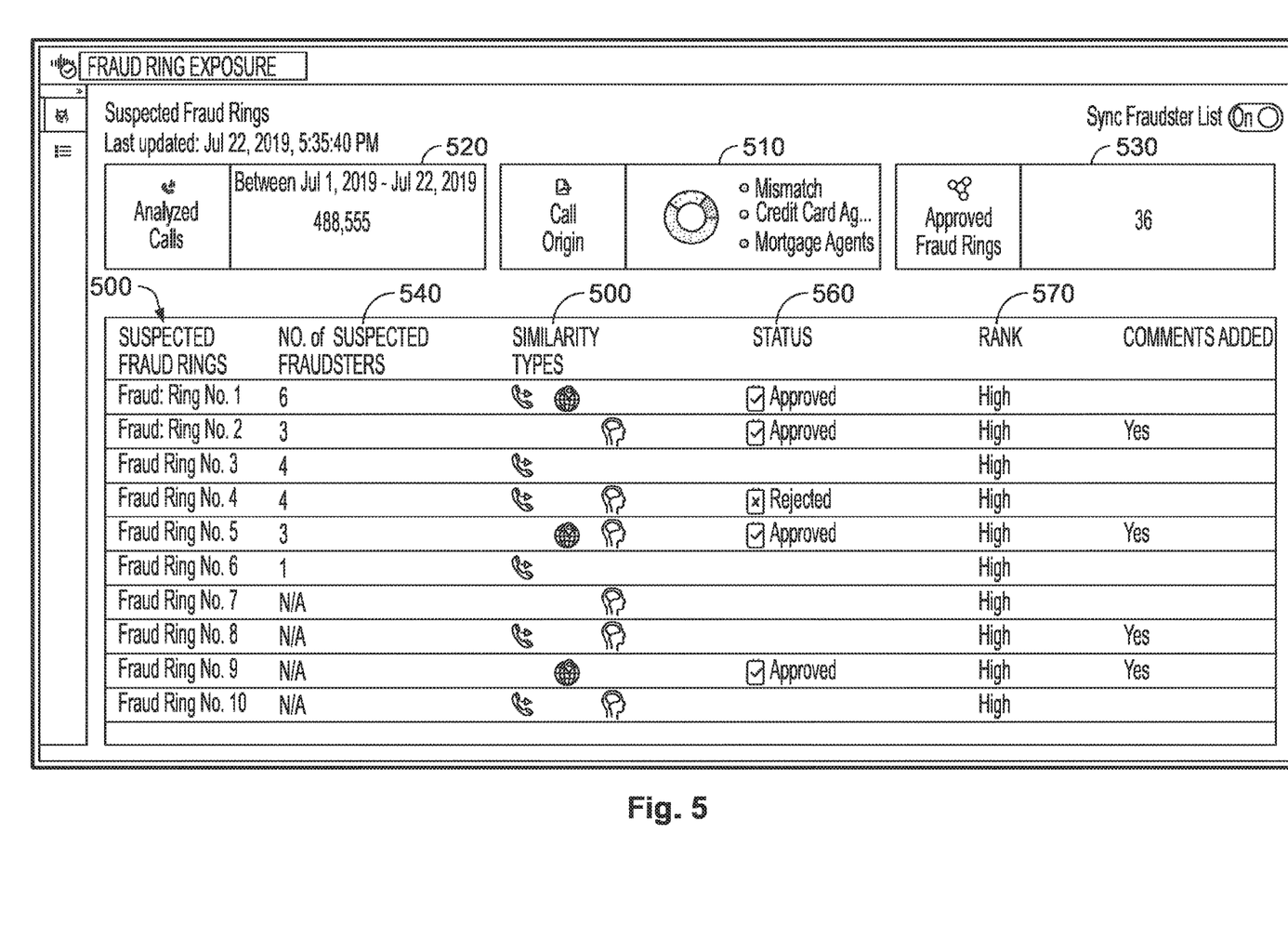
FIG. 5 depicts an example user interface according to embodiments of the present invention.

An example user interface is shown in FIG. 5, according to embodiments of the present invention. The screen shown in FIG. 5 may be displayed, e.g. on analyst terminal 14, to for example a security officer or another person who may review information described by the analysis and take action, for example determine if a detected or identified fraud ring should be accepted as-is (e.g. "approve"), or rejected (e.g. not be deemed to be a fraud ring), re-rate or modify a relevance of a ring, or other actions. An identified or "deemed" fraud ring may be for example one whose relevance score is above a pre-defined threshold, or one where a model (e.g. an ML model) determines the ring is relevant. At the top of the example screen shown in FIG. 5 is the date when the suspected fraudster list was updated may be displayed. Widgets or controls may display information about the analyzed interactions, such as the interaction origin 510 (e.g. what caused the calls to be deemed potentially fraudulent, and the proportion of the origins), the number of interactions analyzed 520 and the number of approved or deemed relevant fraud rings 530.

A display may include information on a set of rings 500, each entry (e.g. row) for a ring including details such as the number of suspected fraudsters or clusters 540 that are part of the ring, similarity types 550 (e.g. criteria that were used for deciding that the fraudsters or clusters are related to the same fraud ring, such as ANI, location, behavioral data, etc.), a status 560 (e.g. if a user approved the ring as being relevant or not), a rank or relevance score 570 (which may be a number, e.g. 0-1, or discrete categories such as high/medium/low or relevant/not relevant) and other data such as whether comments have been added. A user may indicate or double click on a displayed fraud ring to "drill down" and display an expanded view including for example, as a list of individual fraudsters in the cluster, the number of speaker IDs (the ID of the claimed customer, or an ID generated for a suspected fraudster, used to track that suspected fraudster) for each fraudster, the type of detected fraud behavior, the number of calls attributed to that fraudster (e.g. as part of the ring, or calls detected outside the ring), the frequency of a fraudster's activity, a status (e.g. the caller or speaker was added to a watch list), the rank or relevance (e.g. a PFE rank categorizing fraudsters by low, medium and high, typically relative to other suspected fraudsters), a type of fraud attempted by an individual, and comments if any. A ring may have a rank or relevance (e.g. low, medium, high) separate from the rank of fraudsters in the ring. A cluster or fraudsters may be ranked for example based on how likely the cluster is indeed a cluster of the same person.

A security officer reviewing the presented fraud rings may for example, approve the ring (e.g. confirm it is actually a relevant fraud ring, such confirmation possibly being fed back to the relevance module), reject the ring (e.g. correct that it is not a relevant fraud ring, such information possibly being fed back to the relevance module for training), or send FRE engine 40 other input according to the taken decision, to allow it to learn about its recommendations' quality. FRE engine 40 may use the security officer's input to re-train its model. FRE engine 40 may use a security officer's input to detect consistent fraud ring detection results, which may contribute to the automation of the process. Known outcomes of historical interactions (e.g. post-facto knowledge of a perpetrated fraud) can be used by a security officer to refine and redefine the rules and weights in the engine. The approved rings' individuals may be added, e.g. automatically or by a security officer, to a real-time watchlist of fraudsters (e.g. such that if any member of the ring contacts the contact center, an alert is presented or triggered in real time). Such a watchlist may be used automatically as part of fraudster detection on future calls. Creating a relevance value or score defining the relative relevance of a newly seen fraud ring may use information regarding previously seen fraud rings: for example an embodiment may have received from a person such as a security officer a relevance value for a previous or previously seen fraud ring, and may use the received relevance value to create a relevance value defining the relative relevance of the newly seen fraud ring. This may be done by comparing the new and previously seen rings: for example creating a relevance value for a newly seen ring may include first comparing the new fraud ring to a fraud ring having a previously determined relevance value, and then using this comparison, and the relevance value of the previously seen ring, to determine a relevance value for the new ring.

A user display may display the type of fraud attempted, including for example:
1. Multiple accounts—the same person tries to penetrate multiple accounts.
2. Same account—the same person tries to penetrate the same account multiple times.
3. Same day—majority of the calls happened in the same 24 hours.
4. Frequent—majority of the calls happened in 5 days' time frame.

Various methods may be used to calculate a relevance value or function, which may be a numeric measure to represent the danger, threat, or other function of importance of a fraud ring. A relevance value or function may define the relevance of the ring relative to other rings. A value of a relevance value or function may be for example a range of 0-1, 0-100, or another scale. A relevance value or function may aim to estimate the significance of inputs such as data describing the ring itself, e.g. data represented by a graph representing the ring, and/or data such the identities of the speakers in a ring, metadata such as ANIs in a ring, IPs of the speakers, geolocations of the speaker, claimed speaker IDs, credit card numbers, account IDs, etc. and connections between such items in the graph (e.g. the edges).

A given ring may be defined by for example a vector X(A, Y) where A may be clusters relevant to or defining the ring (e.g. output from a PFE process) and Y may be metadata, presented as for example key-value combinations (the key being the descriptor or category and the value being the value corresponding to the key) which, in in combination with a system's knowledge about previously seen rings' data and these rings importance, determines a new rings' relevance or importance. Importance or relevance may be exterior information input by a security analyst, such that over time a system or the engine learns to identify importance or relevance in an implicit way through machine learning. After appropriate machine learning or training the importance or relevance remains implicit but a system is able to determine importance or relevance using a trained engine Various methods may be used to construct or create the relevance value or function.

In a rule-based method, expert knowledge may be used to create a relevance value or function. This relies on the security personnel's knowledge of whether a ring is relevant or not, and thus it may be difficult to estimate it continuously. For example, it may be questionable as to whether an expert that asserts a ring is relevant can be relied on with much accuracy. Thus in some embodiments a security officer may be asked to provide a binary relevant/not relevant input, rather than a numerical rating. A security officer may alter weights or relevance of data in a ring; e.g. arcs or links.

Various machine learning (ML) or artificial intelligence systems or algorithms may be used to create a relevance value or function.

Expert data, such as historical data or human labelling, may be used to train deep learning, deep-Q, reinforcement learning, or other machine learning tools. For example, in a supervised learning system, human experts may label each ring in a binary manner (relevant=1, not relevant=0). This "wisdom of the crowd" (e.g. the experts) analysis may be input to an ML tool or system such as random forest or a neural network which may be trained, and which may then create relevance scores for new or unseen rings. Expert or historical data input to train ML algorithms may be in the form of a trained model F—(Deterministic or semi-stochastic), where F maps each ring X to an interval I (e.g. [0,1] or [0,100]), where I is the relevance score scale. In an inference operation to determine if a ring is deemed relevant, an inference module (e.g. an ML module) may receive a pre-defined relevance threshold T (for example a number in range I) and the pair (X, F), X being a ring and F being a model, and may output y∈I. In other embodiments, thresholds need not be used. In some embodiments, an ML embodiment may output a score or rating which, if above a threshold, deems the ring relevant, and if not above the threshold, deems the ring not relevant. The output may be a distilled relevance measure that attaches a relevance value or score to every given fraud ring.

Another ML system that may be used includes a random forest method, which may be a supervised learning method. A random forest ML system is an ensemble learning method for operating by constructing a number of decision trees at training time. A set of decision trees may be constructed. For each tree rings may be injected or input with their associated labels (e g human generated relevance scores, for example on a scale or binary). At each step or decision within a tree a security office may pick or determine which attribute in the ring to cause a decision or split based upon an importance generic measurement (e.g. information gain, purity gain) associated with the importance of an attribute of the ring to its relevance. This may be done for a set of known rings. The output may be a set of trees, that for a given new, unseen, fraud ring returns a set of distributions that is combined into a single core. After such training using pre-categorized or pre-rated rings (input with their relevance value), a new ring when input to the random forest receives from the random forest a relevance value.

One ML system to create a relevance value includes a NN such as a deep NN, which may be a supervised learning method. A NN may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

During training of a NN fraud rings and labels (e.g. human generated relevance scores, for example on a scale or binary) may be input to the NN. For example, labels may be in a binary mask, where the rings are in continuous or binary representation. At each step or iteration a ring may be provided to a NN as an input and if the network calculated the relevance label or score correctly nothing is done, otherwise the NN weights may be adjusted using NN back propagation. The output may be a NN with fixed weights that is able to predict every ring (e.g. in a similar mechanism to a random forest).

One embodiment using a NN such as a DNN may estimate the odds that a ring is indeed "interesting" or relevant. In one example, rings are considered relevant for analysis if the amount of ANIs that exist in the ring (some may find a unique ANI as relevant, other many) is above or below a certain amount, credit types or categories lower than 3 and a high PFE classes or ratings (in one embodiment, the higher the number of calls in a PFE, the higher its class). Data input to the NN may be labelled based on rules such as this and provide the NN data for training. Training may be performed by inputting a number of sample rings to a NN, having a security specialist rate or determine the output to provide a correction, and have the NN calculate loss and perform back propagation for NN training. The example NN may return that:

P(Ring A is relevant)=0.99
P(Ring B is relevant)=0.2
P(Ring C is relevant)=0.99

One ML system to create a relevance value includes Bayesian methods as are known in the art (e.g. statistical inference in which Bayes' theorem is used to update the probability for a hypothesis as more information becomes available). In an embodiment using Bayesian methods, there may be an assumption about the distribution of the relevance scores in fraud rings; using this the parameters of the distribution e.g. mean and variance for a Gaussian distribution, may be trained (e.g. if it is believed that the relevance has a Gaussian distribution, the mean and standard deviation may be learned), A Bayesian training method may be performed to learn generic distribution through generic parameters (e.g. mean and variance), to learn a certain Gaussian distribution of relevance scores of rings, After such training the distribution may be used to take as input a newly seen ring, and to output the likelihood of the relevance of that ring falling at a certain spot on the distribution. For example, rings represented as numbers such as hot codings or embeddings may be distributed with assigned relevance scores across a Gaussian distribution, and a new ring may be placed in the Gaussian such that its relevance, as a probability measure, may be determined.

ML systems used to create relevance values may include unsupervised learning methods. Unsupervised methods differ from supervised in the sense that there are no labels or scores provided by humans (at least to start: feedback may be provided after an initial analysis). This may prevent the learning of a deterministic function from the rings to the relevance space (e.g. the interval [0,1]). A suitable unsupervised ML learning algorithm may learn from the data existing, which is the rings themselves. An algorithm may learn appropriate representations within the data. Having such representations with a coherent metric function on the space of representation may aid in learning as it may be assumed that the relevance function continues in some level. Unsupervised (or supervised) methods may compare data representations of rings to find rings which are similar to each other, e.g. in a graph or based on another representation.

That continuity may hold may be seen from the opposite scenario, where one assumes that the relevance function has manners of Dirichlet function, shown below in equation 1: Let c and d≠c be real numbers (usually taken as c=1 and d=0). The Dirichlet function is defined by $$D(x) = \begin{cases} c & \text{for } x \text{ rational} \\ d & \text{for } x \text{ irrational} \end{cases}. \qquad \text{Eq. 1}$$

The meaning of the Dirichlet function discontinuity is that similar fraud rings are not similarly relevant. This is perhaps possible, but removes every plausible mechanism. Thus continuity is essential. Embodiments of the invention may use embedding techniques such that rings are mapped into vectors (e.g. ordered lists of numbers corresponding to characteristics of the rings) and vectors that are near each other by some measure are assumed to have near or close relevance. Thus knowing the relevance for a previously seen ring and the distance between the vector for that ring and a new ring, one may determine the relevance for the new ring.

Figure 6:
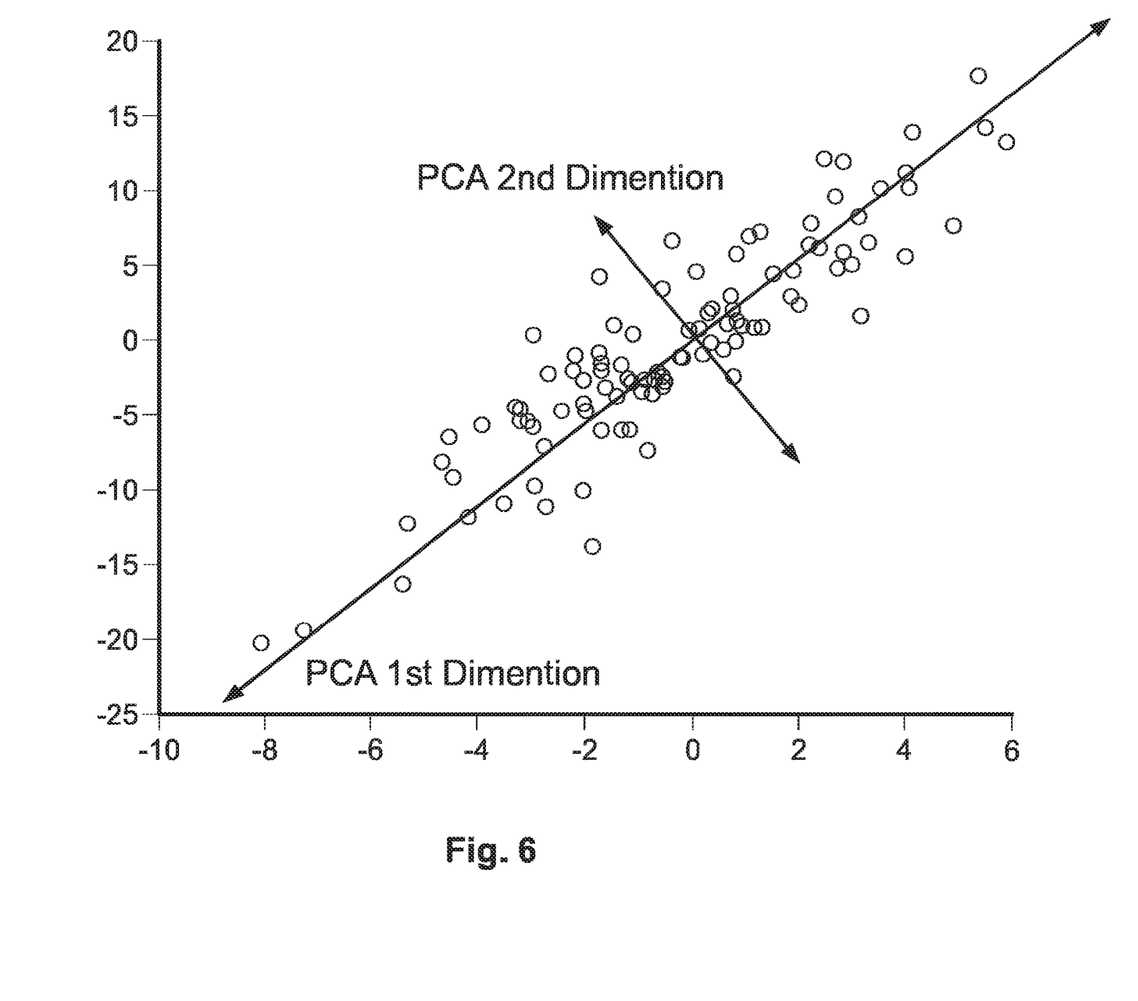
FIG. 6 depicts representations of fraud rings graphed according to an embodiment of the present invention.

One ML embedding technique that may be used to create a relevance value defining the relative relevance of a fraud ring is PCA. A PCA embodiment may input all fraud ring vectors (e.g. a vector X(A, Y) where A may be clusters relevant to or defining the ring and Y may be metadata) and measure their covariance matrix. From that an embodiment may calculate the eigen states and project the vectors on the leading states (e.g. leading upon the eigen values magnitude). The output may be a set of values of linearly uncorrelated variables which may allow a user or process to determine the most relevant or important attributes of rings. Such an example projection is shown in the graph in FIG. 6. FIG. 6 depicts representations of fraud rings graphed according to an embodiment of the present invention. In FIG. 6, each of the X axis and Y axis represents the two characteristics (e.g. tenure and annual income) of the plotted rings (represented by circles on the graph), which are zeroed, per the X and Y axes. Data corresponding to fraud rings (represented as circles) may be plotted in its raw representation after being centerized (e.g. the mean is subtracted from each coordinate's data). The PCA representation in FIG. 6 may provide a new set of coordinates (PCA first and second dimensions), using rotated axes where the angle is determined by the singularities of the data variance. The PCA first and second dimensions may represent the highest variance direction and the best perpendicular to this direction. In FIG. 6 the PCA $1^{st}$ dimension 600 represents a leading component (e.g. most important data variance-wise) and PCA 2d dimension 602 represents a second leading component. Fraud rings 604 are plotted according to these components. An analysis such as FIG. 6 may be used to determine input to an ML or other tool.

Another ML technique used in some embodiments is ring embedding. Embedding is used in text analysis and natural language processing (NLP) and may resolve the need for quantitative representation of words. In the context of ring analysis, embedding may classify rings as being similar or not to each other, which in combination with a user's input regarding the relevance of certain rings, may allow for an automatic determination of the relevance of newly seen rings whose relevance has not been rated by a user. An unsupervised version of embedding may be performed by an autoencoder. An engine such as a NN may receive an input vector (e.g. an ordered series of numbers such as a hot coding) describing a fraud ring. The engine may map the ring to a lower dimension space (e.g. a vector representing the ring and which may be used to determine the ring's similarity to other rings) and then restore it to the original vector space for the purpose of learning to accurately encode rings. Learning such as NN backpropagation may be performed based on the restored vector: the error may be calculated between the input and the output, typically performed in L2 norm (e.g. the square root of the element wise square differences). A weight update of the NN may follow backpropagation based on the error. The resulting embedding representations may be mapped to a Euclidean space to determine the distance and thus possibly the similarity between rings.

Characteristics describing the ring or the entities constituting the ring (e.g. clusters or individuals) may be represented as hot coded vectors. "One hot" encoding translates categorical variables or numbers into a form provided to ML algorithms. A one-hot coding is a group of bits where the legal combinations (typically for a data item) include only those with a single high (1) bit and all the others low (0). For example, if a certain characteristic of a cluster entity has a value of 0-5 (e.g. tenure or length of time of a person as being known by an institution) that may be represented as 0=000001, 1=000010, 2=000100, etc.

In one example, a ring is defined by entities or clusters each cluster representing a person. Each entity in one example is described by tenure (length of time known by the system), gender, ANI, PFE class, score or results (e.g. a PFE score may represent the average of similarity scores within clusters; a PFE class may be higher the number of separate calls within a PFE) and credit degree or assessment (represented using two genders, 5 types of or different ANIs (an ANI is typically a telephone number; here it is depicted as a low integer for simplicity), 10 PFE classes, 6 credit degrees and 7 ranges or lengths of tenures. Three example people may have the following characteristics where the integers correspond to a characteristic, e.g. male=1, female=0:

Person A has tenure 1, gender 1, PFE 3, ANI 2 and credit 1

Person B has tenure 2, gender 0, PFE 5, ANI 0 and credit 4

Person C has tenure 2, gender 0, PFE 3, ANI 2 and credit 1

One embodiment uses one hot coding method for each attribute, in order to represent for input to an ML algorithm a ring's constituent people (e.g. clusters). Thus the three rings are represented as (in the following simplified example each ring includes one person; typically a ring includes more than one person):

Ring A [0.1.0.0.0.0.0.0.1.0.0.0.1.0.0.0.0.0.0.0.1. 0.0.0.1.0.0.0.0.]

Ring B: [0.0.1.0.0.0.0.1.0.0.0.0.0.0.1.0.0.0.0.1.0.0.0.0. 0.0.0.0.1.0.]

Ring C: [0.0.1.0.0.0.0.1.0.0.0.0.1.0.0.0.0.0.0.0.0.1.0.0.0.1.0.0.0.0.]

Such hot coded vectors are input to an autoencoder. After that, geometry may be measured: the vectors output from the auto encoder may have distances measured between each pair (e.g. measuring the Euclidian distances between entities). For example, the distances between the rings (represented as an example as groups of people) discussed above may be:

D(A,B)=3.7765644
D(A,C)=1.788
D(B,C)=3.203643

In this example rings A and C are closest. In one embodiment, a user provides input regarding the relevance of a certain ring, and based on that relevance and the distance to a ring X, which is new and unseen or not rated by a user, the relevance of ring X may be determined, for example using a trained NN In this manner, similar clusters may have similar relevance scores.

An output of an ML or other process may be clusters and the suspected fraud rings, rated for relevance, or presented as relevant or not relevant, which may be presented in a display or web application that a security officer can review. The security officer may analyze the present clusters and rings, for example by listening to the associated calls. If the security officer suspects that a call is made by an actual fraudster, he can add the call and the fraudsters information to a fraudsters' watch list. If the officer deems the call to be not of a fraudster, or the ring not relevant, an appropriate process may receive feedback from the officer and possible adjust its model. Later, if the same fraudster calls the contact center, it may be detected by a real-time fraudster prevention solution.

Various data structures may store the data described herein. Voice data buffers may be held using byte-arrays storing binary data. Scores may be numeric values, held in a data structure such as a dictionary, mapping a pair of compared measures to their comparison score result. Alternatively, scores can be stored as a List as JSON structures or similar. A PFE engine may use i-vectors to represent the voiceprints. i-vectors may be stored as byte-arrays. An "i-vector" may be an intermediate vectors or identity vector which is an enhancement for a previously used approach in speaker verification technology called Joint Factor Analysis (JFA). JFA divides a human voice into two factors: a speaker factor and a channel factor. The data structure of the i-vectors may be an array, and each element in the data structure may represent a characteristic of the speech of a speaker. The i-vectors may be generated as part of voiceprint generation for later comparison of a speaker.

Interaction metadata may be stored as a complex object containing lists of information, such as different business data strings. Examples for interaction metadata include interaction ID, local start time, local stop time, GMT start time, GMT stop time, interaction duration, open reason or close reason (e.g. the reason for initiating or stopping the interaction recording), switch ID, user ID, interaction type, media type, dialed-from number (ANI), participants, contact ID, contact start time, call ID or other data. Customer metadata may be stored as a complex object including for example: Customer ID, tenant ID (e.g. the identity of the organization owning or creating the data or associated with the customers, in the case of a system handling multiple such organizations), CRM reference, gender ID, first name, last name, address, birth date, seniority, nationality, state of origin, credit risk, marital status or other data.

Figure 7:
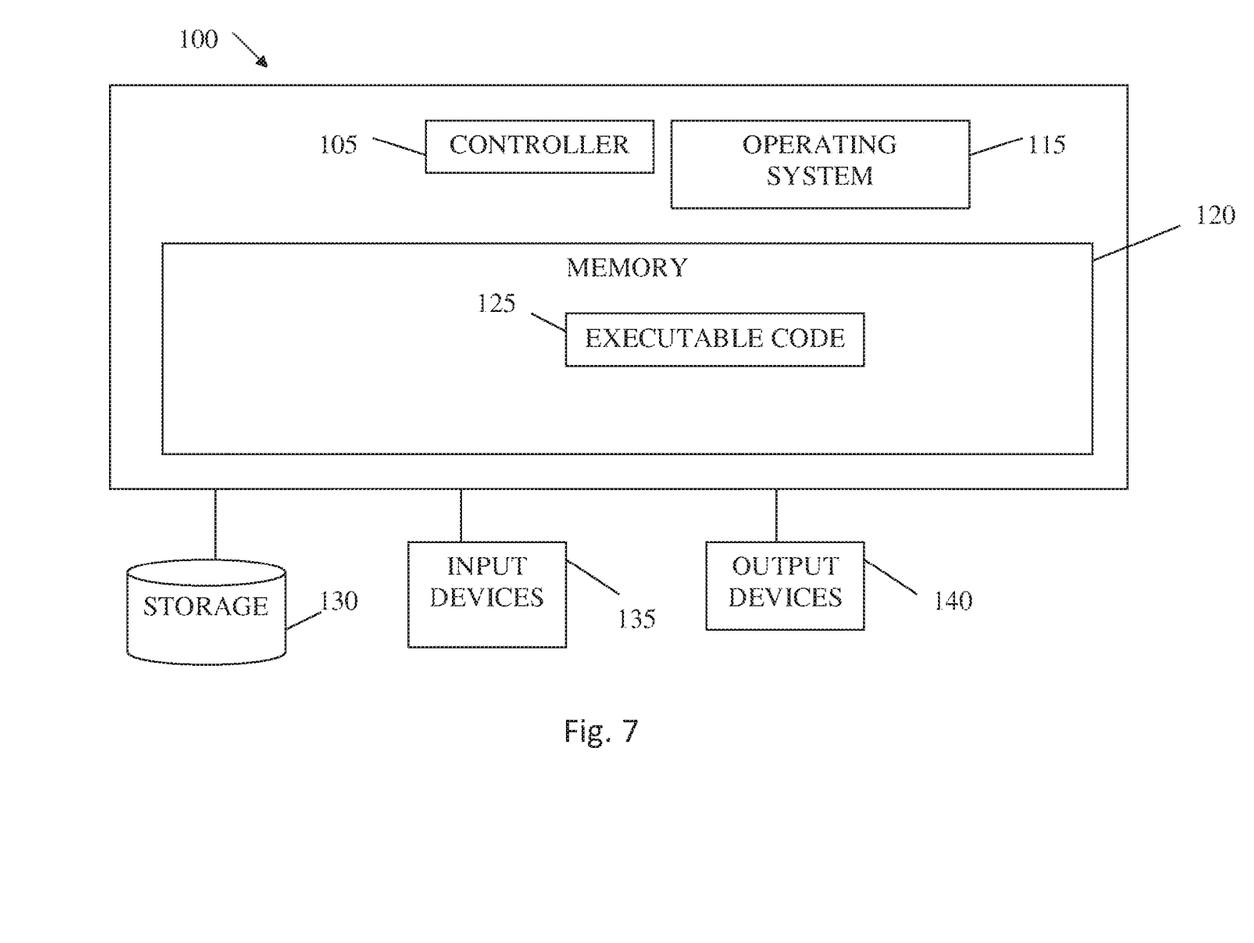
FIG. 7 shows a high-level block diagram of an exemplary computing device according to some embodiments of the present invention.

Reference is made to FIG. 7, showing a high-level block diagram of an exemplary computing device according to some embodiments of the present invention. Computing device 100 may include a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. for example when executing code 125. More than one computing device 100 may be included in, and one or more computing devices 100 may be, or act as the components of, a system according to embodiments of the invention. Various components, computers, and modules of FIG. 1 may be or include devices such as computing device 100, and one or more devices such as computing device 100 may carry out functions such as those described in FIG. 2. For example, PFE engine 30, FRE engine 40, agent and other terminals, and ML, NN or other relevance score processes may be implemented on or executed by a computing device 100.

Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may configure controller 105 to perform clustering, ring detection, or ring rating or scoring, to handle or record interactions or calls, and perform other methods as described herein. Although, for the sake of clarity, a single item of executable code 125 is shown in FIG. 7, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as interactions, metadata, biometric system samples, parameters or thresholds may be stored in storage system 130 and may be loaded from storage system 130 into memory 120 where it may be processed by controller 105. Some of the components shown in FIG. 7 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (MC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, or any other suitable computing device. A system as described herein may include one or more devices such as computing device 100.

When discussed herein, "a" computer processor performing functions may mean one computer processor performing the functions or multiple computer processors or modules performing the functions; for example a process as described herein may be performed by one or more processors, possibly in different locations.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for identifying a fraud ring based on interaction data, the method comprising:

analyzing, by a computer processor, interaction data comprising audio recordings to identify clusters of interactions which are suspected of involving fraud and grouping clusters including a single speaker;

analyzing by the computer processor the clusters, in combination with metadata associated with the interaction data, to identify fraud rings, without requiring further input from a user, each fraud ring defined by a set of speakers and a set of metadata corresponding to interactions including said single speaker; and for each fraud ring, creating a relevance value defining a relative relevance of the fraud ring.

2. The method of claim 1 wherein creating the relevance value is performed using a supervised learning method.

3. The method of claim 1 wherein each cluster is represented by a graph.

4. The method of claim 1 wherein each ring is represented by a graph.

5. The method of claim 1 wherein creating a relevance value is performed using a machine learning system.

6. The method of claim 1 wherein creating a relevance value is performed using an unsupervised learning system.

7. The method of claim 1 comprising, prior to creating a relevance value defining the relative relevance of the fraud ring:

receiving from a security officer a relevance value for a previous fraud ring, and using the received relevance value to create a relevance value defining the relative relevance of the fraud ring.

8. The method of claim 1 comprising creating a relevance value defining the relative relevance of the fraud ring by comparing the fraud ring to a fraud ring having a previously determined relevance value.

9. A system for identifying a fraud ring based on interaction data, the system comprising:

a memory; and a processor configured to:

analyze by a computer processor interaction data comprising audio recordings to identify clusters of interactions which are suspected of involving fraud and grouping clusters including a single speaker;

analyze by the computer processor the clusters, in combination with metadata associated with the interaction data, to identify fraud rings, without requiring further input from a user, each fraud ring defined by a set of speakers and a set of metadata corresponding to interactions including said speaker; and for each fraud ring, create a relevance value defining a relative relevance of the fraud ring.

10. The system of claim 9 wherein creating the relevance value is created using a supervised learning method.

11. The system of claim 9 wherein each cluster is represented by a graph.

12. The system of claim 9 wherein each ring is represented by a graph.

13. The system of claim 9 wherein creating a relevance value is performed using a machine learning system.

14. The system of claim 9 wherein creating a relevance value is performed using an unsupervised learning system.

15. The system of claim 9 wherein the processor is configured to, prior to creating a relevance value defining the relative relevance of the fraud ring: receive from a security officer a relevance value for a previous fraud ring, and use the received relevance value to create a relevance value defining the relative relevance of the fraud ring.

16. The system of claim 9 wherein the processor is configured to create a relevance value defining the relative relevance of the fraud ring by comparing the fraud ring to a fraud ring having a previously determined relevance value.

17. A method for identifying a fraud ring, the method comprising:

identifying clusters suspected of fraud and grouping clusters comprising audio recordings each audio recording associated with a speaker;

analyzing by the computer processor the clusters, in combination with metadata associated with the audio recordings data, to create fraud rings, each fraud ring associated with a plurality of different speakers and a set of metadata corresponding to the speakers; and for each fraud ring, calculating a relevance score, without requiring further input from a user.

18. The method of claim 17 wherein creating the relevance score is performed using a supervised learning method.

19. The method of claim 17 wherein each cluster is represented by a graph.

20. The method of claim 17 wherein each ring is represented by a graph.

* * * * *